United States Patent
Nakagaki

(10) Patent No.: US 12,237,983 B2
(45) Date of Patent: *Feb. 25, 2025

(54) NETWORK MANAGEMENT ENGINE FOR A CLOUD COMPUTING SYSTEM

(71) Applicant: Microsoft Technology Licensing, LLC, Redmond, WA (US)

(72) Inventor: Kooichi Christopher Nakagaki, Atlanta, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,768

(22) Filed: Sep. 11, 2023

(65) Prior Publication Data
US 2024/0080248 A1 Mar. 7, 2024

Related U.S. Application Data

(63) Continuation of application No. 17/902,276, filed on Sep. 2, 2022, now Pat. No. 11,792,088.

(51) Int. Cl.
*H04L 41/50* (2022.01)
*H04L 41/0677* (2022.01)
*H04L 41/082* (2022.01)

(52) U.S. Cl.
CPC .......... *H04L 41/50* (2013.01); *H04L 41/0677* (2013.01); *H04L 41/082* (2013.01)

(58) Field of Classification Search
None
See application file for complete search history.

(56) References Cited

U.S. PATENT DOCUMENTS 9,912,755 B2 * 3/2018 Chandwani ............. H04L 67/02
11,226,848 B2 * 1/2022 Bahramshahry .... G06F 11/1458
(Continued)

OTHER PUBLICATIONS

"International Search Report and Written Opinion issued in PCT Application No. PCT/US23/027963", Mailed Date: Oct. 10, 2023, 14 Pages.

*Primary Examiner* — Ranodhi Serrao
(74) *Attorney, Agent, or Firm* — Shook, Hardy & Bacon L.L.P.

(57) ABSTRACT

Methods, systems, and computer storage media for providing a network conflict management service that is associated with a network management engine of a cloud computing system. In operation, cross-premises networking information is accessed at a cross-premises networking information database. The cross-premises networking information comprises on-premise network extension data associated with managing and routing on-premise networks and a cloud-provider network. Networking information for a first network is retrieved from the cross-premise networking information database. The networking information of the first network is compared to networking information of a second network, the networking information of the second network (e.g., networking information associated with a request to create the second network). Based on comparing the networking information of the first network to the networking information of the second network, a determination is made that a network conflict exists. Based determining that the network conflict exists, a notification of the network conflict is communicated.

20 Claims, 10 Drawing Sheets

(56) References Cited

U.S. PATENT DOCUMENTS

| | | | |
|---|---|---|---|
| 11,294,726 B2* | 4/2022 | Bahramshahry | G06F 9/5044 |
| 11,424,990 B2* | 8/2022 | Singhal | H04L 41/12 |
| 11,461,786 B2* | 10/2022 | Knapp | G06F 16/9035 |
| 11,546,245 B2* | 1/2023 | Pande | H04L 12/4633 |
| 11,870,647 B1* | 1/2024 | Zhang | H04L 41/5051 |
| 2002/0191572 A1* | 12/2002 | Weinstein | H04L 63/0892 |
| | | | 370/349 |
| 2004/0215787 A1* | 10/2004 | Gibson | H04L 47/822 |
| | | | 709/227 |
| 2010/0115604 A1* | 5/2010 | Gerber | H04L 45/02 |
| | | | 726/15 |
| 2012/0195319 A1* | 8/2012 | Bragg | H04L 45/04 |
| | | | 370/401 |
| 2013/0054830 A1* | 2/2013 | Nguyen | H04L 45/03 |
| | | | 709/238 |
| 2013/0308646 A1* | 11/2013 | Sajassi | H04L 45/50 |
| | | | 370/395.53 |
| 2015/0103746 A1* | 4/2015 | Matsushima | H04L 69/22 |
| | | | 370/328 |
| 2015/0326579 A1* | 11/2015 | Chandwani | H04L 63/0281 |
| | | | 709/225 |
| 2015/0326672 A1* | 11/2015 | Chandwani | H04L 67/141 |
| | | | 709/227 |
| 2018/0183879 A1* | 6/2018 | Chandwani | H04L 63/0281 |
| 2018/0321971 A1* | 11/2018 | Bahramshahry | G06F 9/4881 |
| 2019/0140895 A1* | 5/2019 | Ennis, Jr. | G06F 9/541 |
| 2020/0026571 A1* | 1/2020 | Bahramshahry | G06F 9/5005 |
| 2020/0092138 A1 | 3/2020 | Tillotson et al. | |
| 2020/0099653 A1 | 3/2020 | Strauss et al. | |
| 2020/0167197 A1* | 5/2020 | Bahramshahry | H04L 41/5003 |
| 2021/0272129 A1* | 9/2021 | Knapp | G06Q 30/0242 |
| 2021/0306383 A1* | 9/2021 | Muravlyannikov | H04L 65/1069 |
| 2021/0367851 A1* | 11/2021 | Singhal | H04L 61/5038 |
| 2022/0301699 A1* | 9/2022 | Crockett | G16H 40/20 |

* cited by examiner ation Ser. No. 17/902,276, filed Sep. 2, 2022. The entire
NETWORK MANAGEMENT ENGINE FOR A CLOUD COMPUTING SYSTEM

CROSS-REFERENCE TO RELATED APPLICATIONS

This application is a continuation of U.S. patent application Ser. No. 17/902,276, filed Sep. 2, 2022. The entire contents of which is hereby incorporated by reference into the present application.

BACKGROUND

Users rely on networked communications between applications and services to accomplish computing tasks. Distributed computing systems (e.g., cloud computing systems) host and support different types of applications and services in on-premise networks or cloud-provider networks. A cloud computing system can support a cloud-provider network that operates with on-premise networks. A cloud computing system can be referred to as a hyperscaler cloud computing because of a capacity of the cloud computing system to scale—demand for resources—to massive numbers of servers that are connected to a cloud provider network of the cloud computing system. The cloud computing system can provide cloud-native applications and services that are accessible via the on-premise network. In particular, the on-premise network can be extended into the cloud-provider network. For example, MICROSOFT AZURE's ExpressRoute connection (i.e., on-premise network extension) can use a private dedicated connection through a third-party connectivity provider to support hybrid application running large-scale workloads via hyperscaler networks.

Conventionally, cloud computing systems are not configured with a comprehensive computing infrastructure and logic to efficient manage network conflicts associated with cloud-provider networks and on-premise networks. For example, a cloud computing system can be implemented with a first virtual network (VNET); however, a second VNET of an on-premise network can conflict with the first VNET. Cloud computing systems do not adequately include computing-based solutions for addressing overlapping ranges in cloud-provider networks and on-premise networks (i.e., collectively "extended cloud-provider network"), consequently, network devices cannot connect to network resources or perform other network operations. As such, a more comprehensive cloud computing system—with an alternative basis for performing network management operations—can improve computing operations and interfaces in cloud computing systems.

SUMMARY

Various aspects of the technology described herein are generally directed to systems, methods, and computer storage media, for among other things, providing a network conflict management service associated with a network management engine of a cloud computing system. The network conflict management service is cross-premises network conflicts solution (e.g., on-premise network conflicts in a cloud-provider network) that provides network management operations via the network management engine of a cloud computing system. For example, the network management engine—that implements the network conflict management service—can be configured to communicate a notification when a determination is made that a potential or an actual network conflict exists—such as overlapping IP ranges in virtual networks (VNET).

The network management engine operates to generate a cross-premises networking information database that specifically includes cross-premises networking information (e.g., network objects) associated with on-premise network extension solutions (e.g., ExpressRoutes, VMWare solutions, on-premise solutions—collectively "on-premise network extension data"). The cross-premises networking information database can be generated based on network objects associated with VNETs, network peering information, and routing tables. The network management engine further introduces functionality—via network management operations—on the cloud-provider side and on-premise side that support detecting new networks that are introduced for communication via on-premise network extensions. The new networks can be introduced using different networking mechanisms and can be detected using different network detection mechanisms. The network management engine further operates to verify that a network conflict (e.g., an overlap in IP ranges) does not exist between a first network and a second network based on accessing cross-premises networking information database. In this way, the network conflict management service can improve network communications detecting potential or actual network conflicts in a cloud-provide network and an on-premise network.

Conventionally, cloud computing systems are not configured with a comprehensive computing infrastructure and logic to efficiently manage network conflicts associated with cloud-provider networks and on-premise networks. A technical solution—to the limitations of conventional cloud computing system operations—provides a network conflict management service associated with a network management engine of a cloud computing system. In operation, cross-premises networking information is accessed at a cross-premises networking information database. The cross-premises networking information comprises on-premise network extension data associated with managing and routing on-premise networks to a cloud-provider network. Networking information for a first network is retrieved from the cross-premise networking information database. The networking information of the first network is compared to networking information of a second network, the networking information of the second network (e.g., networking information associated with a request to create the second network). Based on comparing the networking information of the first network to the networking information of the second network, a determination is made that a network conflict exists. Based determining that the network conflict exists, a notification of the network conflict is communicated.

In addition, in some embodiments, a network management engine client receives a request to create a second network that is associated with networking information of the second network. Networking information of a first network (e.g., an active network) is accessed from a cross-premises networking information database. A determination that a network conflict exists between the first network and the second network is made—based on comparing that the networking information of the first network to the networking information of the second network. The networking management engine client causes presentation of a notification associated with the network conflict.

Moreover, in some embodiments, the network management engine supports generating the cross-premises networking information database. The network management engine accesses cross-premise networking information from a plurality of networks associated with a cloud-provider network. The cross-premises networking information is based on network objects associated with the plurality of networks and the cloud-provider network. Based on the cross-premises networking information, a cross-premises networking information database is generated. The network management engine maintains (e.g., periodically or dynamically) the cross-premises networking information database to support execution of the network conflict checks between the plurality of networks in the cross-premises networking information database and a second network.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein.

DETAILED DESCRIPTION OF THE INVENTION

Overview

Figure 1A:
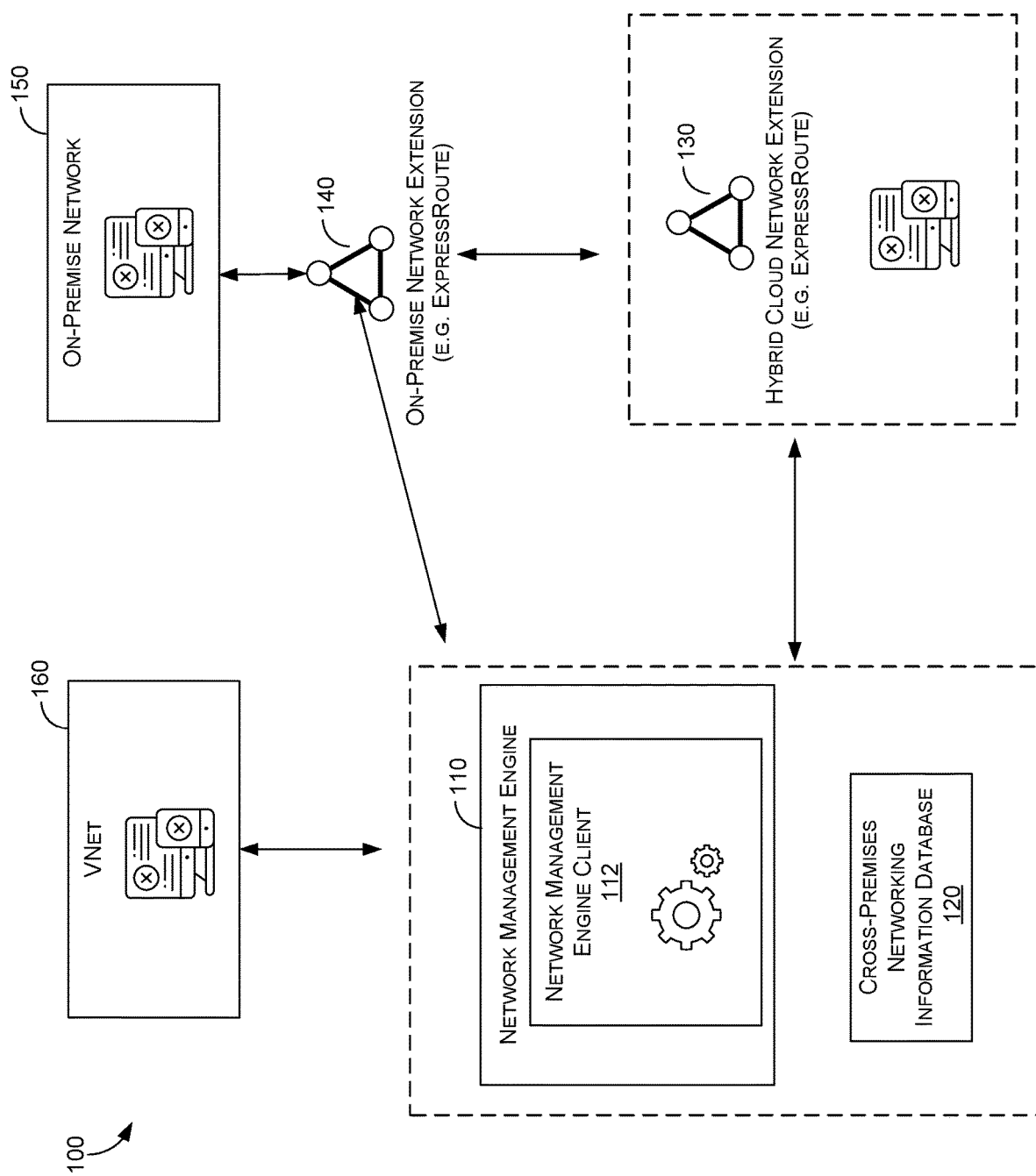
FIGS. 1A and 1B are block diagrams of an exemplary cloud computing system with a network management engine, in which embodiments described herein may be employed.

Cloud computing systems support providing on-demand computing system resources. Cloud computing system implement cloud networking—including a cloud-provider network and on-premise network—to support cloud computing system functionality (e.g., hyperscaler functionality). The cloud-provider network can include cloud-provider networking resources (e.g., the cloud computing system provided and controlled by a cloud provider) and on-premise network can include networking resources for a private cloud network associated with the cloud-provider network. Networking resources can include virtual networks (VNET), virtual routers, firewalls, bandwidth, network management software, on-premise network extension solutions supported via a hyperscale data center. A hyperscale data center can refer to a facility which houses critical compute and network infrastructure, in particular, a hyperscale data center can be enormous mission-critical facilities that can support robust and scalable applications. Conventional enterprise data centers can refer to spaces or buildings that house business Information System (IT) infrastructure. Companies typically use these resources to run their operations. Hyperscale data centers are configured for significantly more performance, capacity, and scalability.

Cloud computing system further support on-demand computing system resources that include virtual networks. A virtual network (VNET) can refer to a virtual environment that can be used to run Virtual Machines (VMs) and applications in the cloud computing system. For example, a VNET can be a fundamental building block for a private network in a distributed computing environment. A VNET enables many types of distributed computing resources (e.g., VM) to securely communicate with each other, the internet, and on-premise networks. A VNET is similar to a traditional network, but can have further benefits of a cloud computing system—such as scale, availability, and isolation. A VENT can be configured via software defined networking (SDN) that provides a way to centrally configure and manage networks and network services. An SDN can allow for separation and fine-grained control of virtual networks using software-controlled configurations.

Conventionally, cloud computing systems are not configured with a comprehensive computing infrastructure and logic to efficiently manage network conflicts associated with cloud-provider networks and on-premise networks—i.e., extended cloud-provider networks that support on-premise network extension. For example, when adding a new VNET on-premise, if the VNET's IP range overlaps with another VNET on the cloud-provider network, this is creates a network conflict. In this way, an on-premise network can be implemented with a first virtual network (VNET); however, a second VNET of a cloud-provider or another on-premise network can conflict with the first VNET. As such, cloud computing systems do not adequately include computing-based solutions for addressing overlapping ranges in extended cloud-provider networks, and consequently, network devices cannot connect to network resources or perform other network operations.

Moreover, conventional cloud computing systems do not provide a computing infrastructure and logic for managing advancements in extended cloud-provider networks (i.e., on-premise network communications with a cloud-provider network) that present different types of operational challenges in the cloud computing system. On-premise virtual networks can refer to remote virtual networks that exist outside of the cloud-provider network. The on-premise network can connect to the cloud-provider network through specific routing mechanisms and networking solutions. For example, on-premise network extension connectivity models (e.g., ExpressRoutes) can let a customer of a cloud computing provider extend their on-premise network into the cloud-provider network over a private connection. An on-premise network can be extended based on peer information that peers the on-premise network with a private peering domain or a cloud-provider peering domain. The benefits of extending an on-premise network raises the possibility of potential and actual network conflicts between on-premise networks (e.g., VNETs) and cloud-provider networks. As such, a more comprehensive cloud computing system—with an alternative basis for performing network management operations—can improve computing operations and interfaces in cloud computing systems.

Embodiments of the present disclosure are directed to providing a network conflict management service associated with a network management engine of a cloud computing system. The network conflict management service is cross-premises network conflicts solution (e.g., on-premise network conflicts in a cloud-provider network) that provides network management operations via the network management engine of a cloud computing system. For example, the network management engine implementing the network conflict management service can be configured to communicate a notification when a determination is made that a potential or an actual network conflict exists—such as overlapping IP ranges in virtual networks (VNET).

The network management engine operates to generate a cross-premises networking information database that specifically includes cross-premises networking information (e.g., network objects) associated with on-premise network extension solutions (e.g., ExpressRoutes, VMWare solutions, on-premise solutions—collectively "on-premise network extension data"). The cross-premises networking information database can be generated based on network objects associated with VNETs, network peering information, and routing tables. The network management engine further introduces functionality—via network management operations—on the cloud-provider network side and on-premise network side that support detecting a new or existing network that is configured (or reconfigured) for communication via on-premise network extensions. The new network (or existing network) can be introduced using different networking mechanisms and as such can be detected using different network detection mechanisms. The network management engine further operates to verify that a network conflict (e.g., an overlap in IP ranges) does not exist between a first network and a second network based on accessing cross-premises networking information database. In this way, the network conflict management service can improve network communications detecting potential or actual network conflicts in a cloud-provide network and an on-premise network.

By way of illustration, a network management engine can aggregate (e.g., via network objects) network peering information, record routing tables (collectively "cross-premises networking information) and generate a cross-premises networking information database. For example, the network management engine can aggregate cross-premises networking information from software defined network devices (SDNs), Border Gateway Protocol (BGP) devices, and on-premise devices. As such, when a new network is added or deleted, the network management engine can detect network changes and update networking information for the new network in the cross-premises networking information database. A new network can include a newly reconfigured network that is an existing network on-premise that is subsequently reconfigured to communicate via an on-premise extension. This newly reconfigured network did not previously communicate via the on-premise extension—as such, no networking information of the newly reconfigured network was previously available at the cross-premises networking information database, until after the reconfiguration and detection by the network management engine. In this way, new VNETs or CIDRs (Classless Inter-Domain Routing) that are requested for configuration into the cloud computing system—via on-premise extension—can be evaluated via the network management engine and auto-approved or highlighted as issue.

In one implementation, an event-based function application can be deployed to maintain the cross-premises networking information database so the cross-premises networking information includes up-to-date network models. In particular, the event-based function application monitors expanding allocation of Internet Protocol (IP) addresses or changes in routing configuration for new networks (including newly reconfigured networks). Such changes can be determined via listening for events (e.g., predefined configuration change events or application-based change events). Events can be associated with SDN, BGP, on-premise devices or configuration interfaces. As such, with these change mechanisms and events, if a potential network conflict or actual network conflict exists, a notification is communicated.

It is contemplated that the cross-premises networking information can be dynamically pulled to update the cross-premises networking information in real-time or periodically updated based on a predefined time period. The cross-premises networking information support visualizing networking path for optimizations in identifying network conflicts. The network management engine can leverage object modeling functionality in the cloud computing system to represent networks as models that are compared to determine if network conflicts exist. In this way, the network management engine aggregates or derives cross-premises networking information to facilitate detecting actual or potential network conflicts.

Figure 1B:
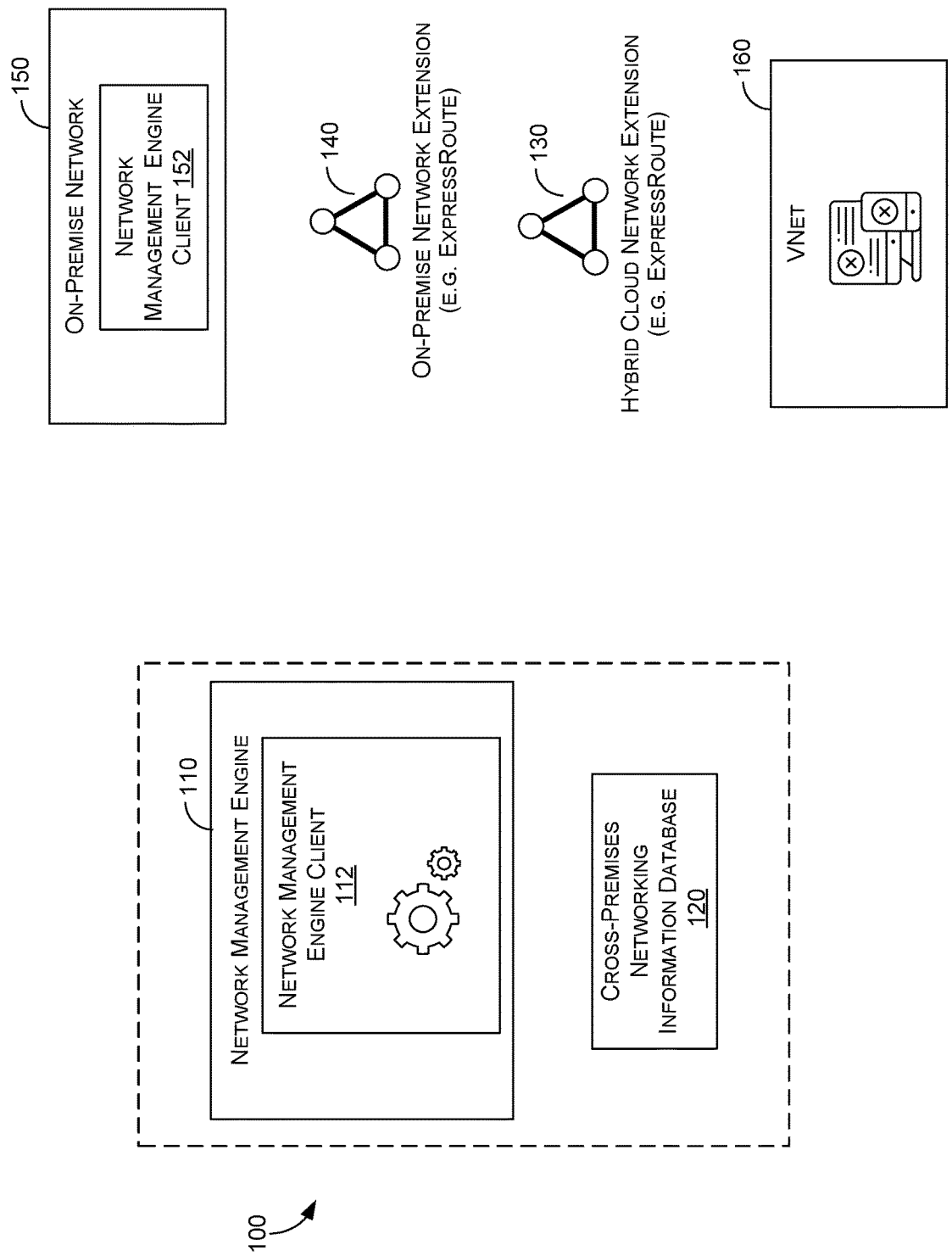
Figure 1C:
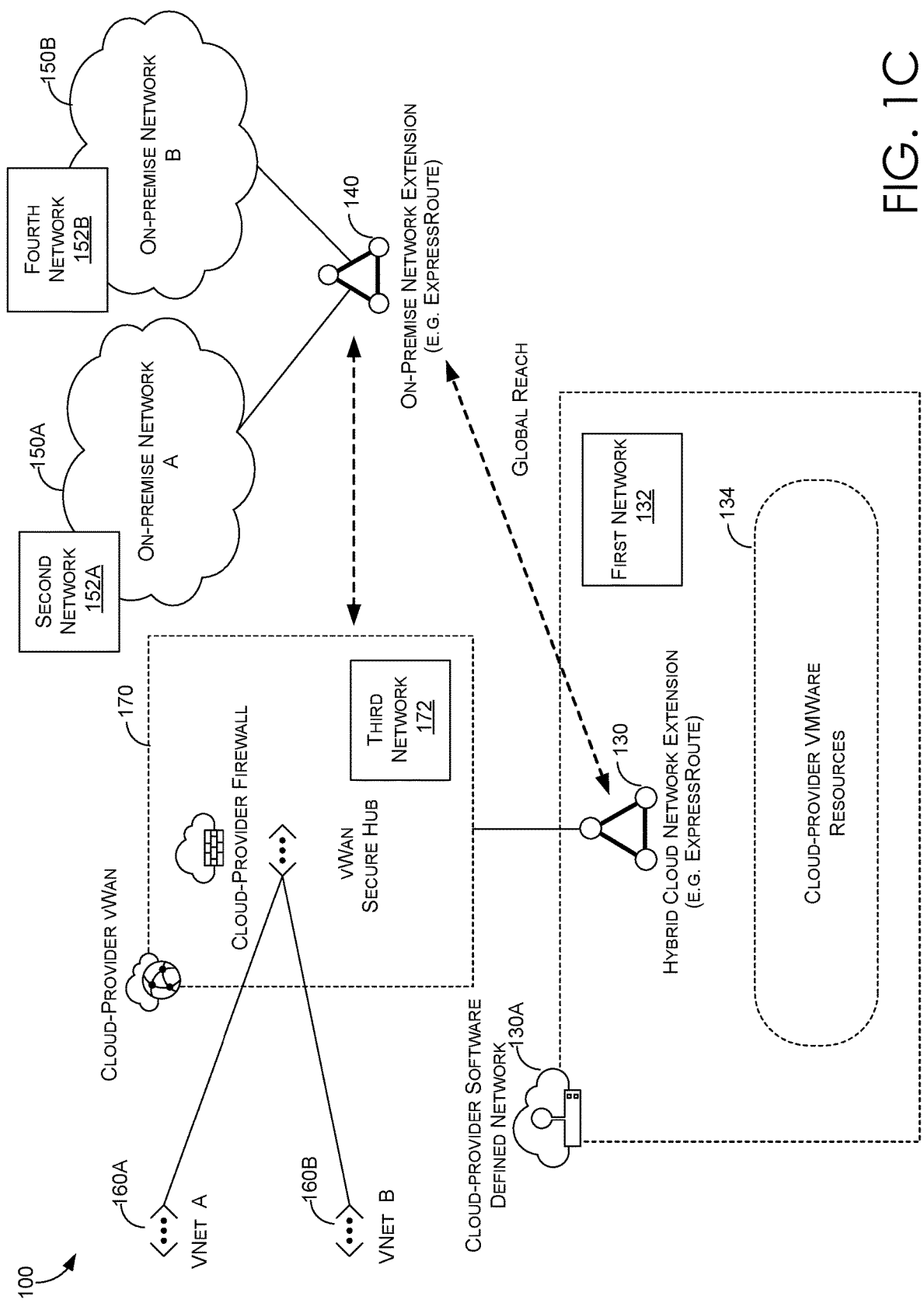
FIG. 1C is an exemplary schematic associated with a cloud computing system with a network management engine, in which embodiments described herein may be employed.

Aspects of the technical solution can be described by way of examples and with reference to FIGS. 1A, 1B, and 1C. FIG. 1A illustrates a cloud computing system 100, network management engine 110, network management engine client 112, cross-premises networking information database 120, hybrid cloud network extension 130, on-premise network extension 140, on-premise network 150, and VNET 160.

Cloud computing system 100 can support a cloud-provider network that operates with on-premise networks for provide cloud computing functionality. A cloud-provider network can provide connectivity between networking devices in the cloud computing system 100. A cloud-provider network can include virtual networks (VNET), ExpressRoutes, VPN Gateways, virtual WANs, virtual network NAT gateways, domain name servers, peering services that support providing network connectivity between cloud computing resources and an on-premise network (e.g., on-premise network 150). The cloud computing system 100 routes traffic (e.g., via route tables or BGP routes) between subnets, connected virtual networks, on-premises networks, and the Internet. Route tables are custom routing configurations with routes that control where traffic is routed to for each subnet. BGP supports dynamic routing protocol, to exchange routes between an on-premises network, the cloud-provider network, and public-available addresses.

Network management engine 110 is responsible for providing network conflict management in an extended cloud-provider network. The networking management engine 110 provide notifications when network conflicts (i.e., potential or actual) exist between networks in the extended cloud-provider. The extended cloud-provider network can refer to the combination of a cloud-provider network and an on-premise network (e.g., on-premise network 150) operating via an on-premise network extension (e.g., on-premise network extension 140 and hybrid cloud network extension 130). The on-premise network 150 can refer to a cross-premises virtual network that is extended to include cloud-provider network resources (e.g., subnets and virtual machines hosted in the cloud-provider network). In this way, computers on an on-premise network connect directly to virtual machines in the cloud-provider network.

With reference to FIG. 1B, FIG. 1B illustrates additional aspects of cloud computing system 100. FIG. 1B network management engine 110, network management engine client 112 and network management operations 114, cross-premises networking information database 120 and network objects, hybrid cloud network extension 130, on-premise network extension 140, on-premise network 150 and network management engine client 152, and VNET 160.

The network management engine 110 operates to generate a cross-premises networking information database 120. The cross-premises networking information database 120 can be generated based on network objects associated with VNETs, network peering information, and routing tables. A network object for a VNET can identify VNET information including a name, a network, a location, tags, and subnets for the VNET. For example, the address space and a corresponding subnet where resources can be connected can be extracted from the network object, where the subnet segments the address space into multiple subnetworks. The VNET can further be associated with an application, a project, a subscription identifier, etc. VNET peering enables connecting virtual networks, where a VNET peering connection enables routing traffic between the networks. Virtual machines in peered VNETs can communicate with each other as if they are within the same network. Thus, a network object having VNET peering information can further help build the cross-premises networking information database.

Cross-premises networking information database 120 also includes information about routing tables. Routing tables or (routing information base) can refer to a data table that list the routes to particular network destinations. Routing tables can further contain information about the topology of their corresponding network. Routing tables can include a network destination, netmask, gateway, interface, and metric. As such, by way of illustration, a network host (or other network device) may store network objects—associated with network peering information and routing tables—such that the network host is queried to retrieve cross-premises networking information that is stored in the cross-premises networking information database 120. For example, the network management engine can aggregate cross-premises networking information from software defined network devices (SDNs), Border Gateway Protocol (BGP) devices, and on-premise devices. Moreover, when networks are added or deleted, the network management engine can detect network changes and update the cross-premises networking information database.

In one implementation, a network management engine client deployed to maintain the cross-premises networking information database so the cross-premises networking information includes up-to-date network models. In particular, the network management engine client monitors expanding allocation of Internet Protocol (IP) addresses or changes in routing configuration for new networks. Such changes can be determined via listening for events (e.g., predefined configuration change events or application-based change events). Events can be associated with SDN, BGP, on-premise devices, devices or configuration interfaces. As such, with these change mechanisms and events, if a potential network conflict or actual network conflict exists, a notification is communicated.

Cross-premises networking information—associated with on-premise extension (e.g., hybrid cloud network extension 130 or on-premise extension 140)—can be dynamically pulled to update the cross-premises networking information in real-time or periodically updated based on a predefined time period. The cross-premises networking information support visualizing networking path for optimizations in identifying network conflicts. For example, a historical record of cross-premises networking information can support identifying a most-recently-added network, such that, the most-recently-added network may be identified as a likely source of an actual conflict in the cloud computing system. In this way, the cross-premises networking information supports historically-based error remediation when conflicts are identified. The network management engine can also leverage an object modeling functionality in the cloud computing system to represent networks as models. The object modeling functionality can support user-friendly graphics-based interfaces that can be presented when networks are compared to determine if network conflicts exist. The interface representation of the networks based on object modeling may further be associated with different types of notifications and notification details that presented. In this way, the network management engine aggregates or derives cross-premises networking information to facilitate detecting actual or potential network conflicts.

With reference to FIG. 1C, FIG. 1C illustrates aspects of the cloud computing system 100 associated with providing the network conflict management service. FIG. 1C includes a cloud computing system 100, cloud-provider software defined network 130A, hybrid cloud network extension 130, first network 132, cloud-provider VMWare resources 134, on-premise network A 152A, second network 152A, on-premise network B, fourth network 152B, VNET 160A, VNET 160B, cloud-provider vWAN 170, third network 172.

Operationally, the cloud computing system provides an extended cloud-provider network with different types of extended connectivity models (e.g., ExpressRoutes connectivity models). A network management engine supports providing a network conflict management service to prevent network conflicts. As such, the network conflict management service operates based on a logic that evaluates networks associated with on-premise extensions to prevent network conflicts with those networks. For example, a network management engine access network objects associated with VNETs, network peering information, and routing tables to generate a cross-premises networking information database. It is contemplated that the network objects can be dynamically discovered within different subscriptions or periodically discovered such that the cross-premises information is maintained and up-to-date prior to determining if two networks have are overlapping. In this way, if a request to configure a new network (e.g., fourth network 1152B) is received, the cross-premises networking information database is accessed and the networking information for the fourth network is compared to networking information for the first network 132, second network 152A, and third network 172.

By way of illustration, several different types of network conflict can be identified using the network management engine. Identifying the network conflict can be associated with the cross-premises network information that associated with the networks and features (e.g., peering information and routing tables) of their configurations. With different types of networks, different types of network conflict checks can be performed. For example, one or more CIBRs, within a VNET, can have multiple subnets, where VNETs, CIBRs, and subnets with cross-premises networking information associated with on-premise network extension are evaluated for potential conflicts. For example, VNET peering connects to VNETs such that the traffic VMs in each VNET are routed directly through the cloud-provider network. If an IP overlap exists when the VNETs are routed through an on-premise extension, a network conflict can identified. The on-premise extension (e.g., ExpressRoute) can support low latency peering between VNETs on-premise and at the cloud-provider. The on-premise extension can be deployed as a virtual network gateway in each virtual network. On-premise networks may have other types of features include no public endpoints, private peering through BGP, and support multiple VNETs connecting through the same on-premise network extension.

Based on the comparing networking information, if a conflict does not exist, a notification is communicated that a conflict does not exist; however, if a conflict exists (e.g., with first network 132), a notification is communicated that a conflict exists. The notification can be caused to be presented on an interface (e.g., associated with an SDN, a BGP, or an on-premise device) for configuring new networks. The notification can include metadata—stored in the cross-premises networking information database—for the conflicting network (i.e., the first network). For example, the notification can identify the on-premises extension connectivity model associated with the network conflict.

Figure 2A:
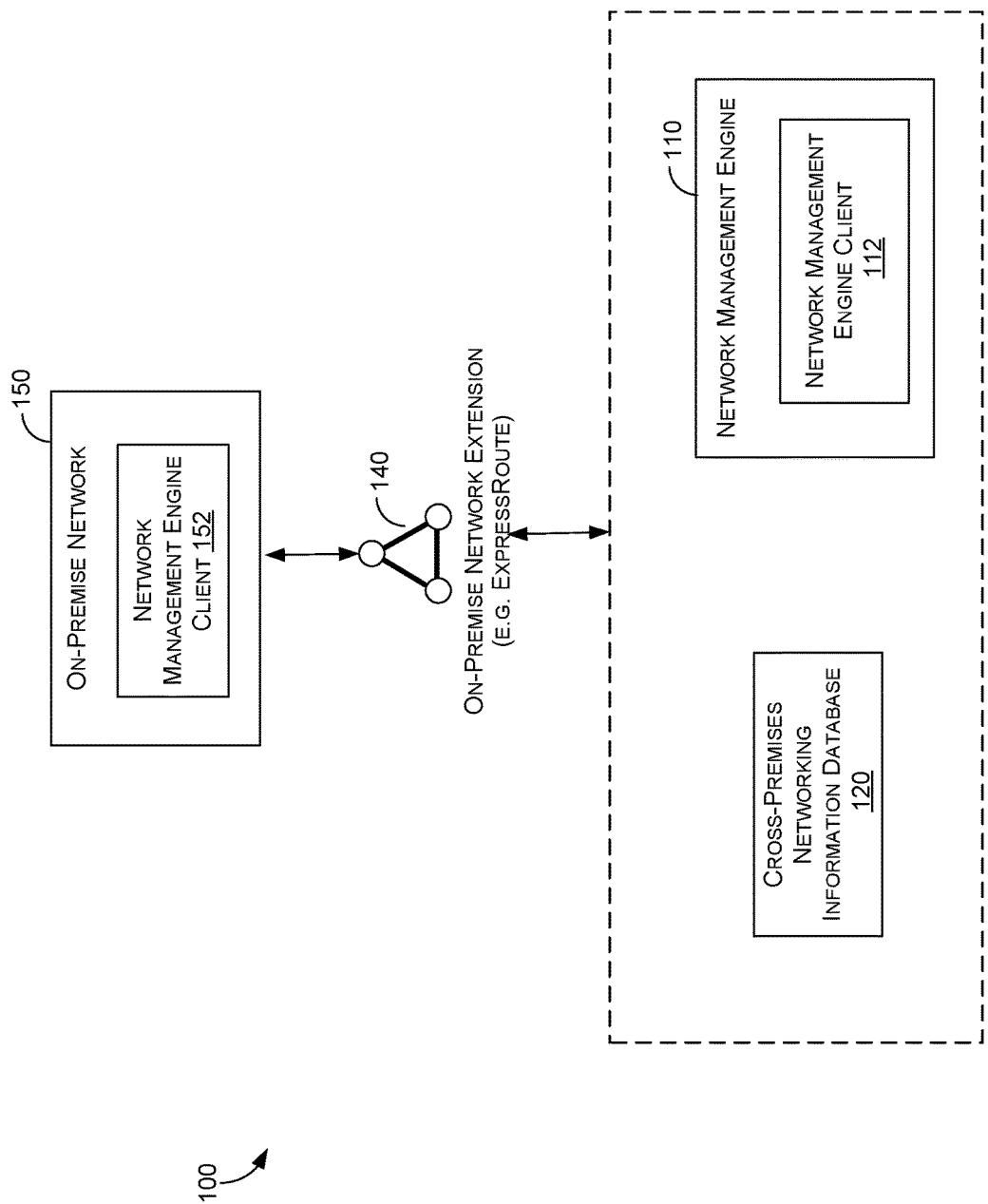
FIGS. 2A and 2B are block diagrams of an exemplary cloud computing system with a network management engine, in which embodiments described herein may be employed.
Figure 2B:
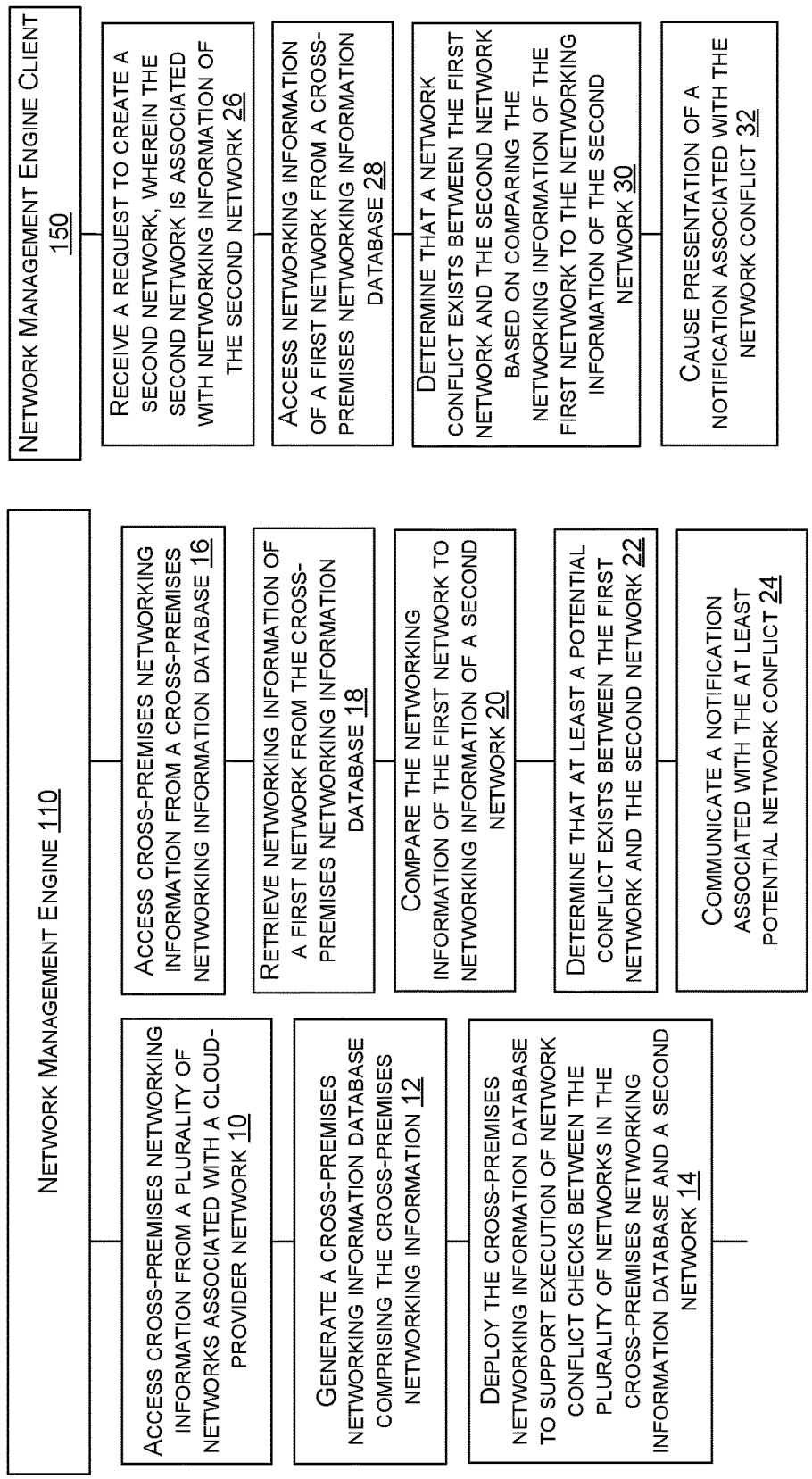

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example cloud computing system 100 in which methods of the present disclosure may be employed. In particular, FIG. 2A shows a high level architecture of the cloud computing system 100 in accordance with implementations of the present disclosure. Among other engines, managers, generators, selectors, or components not shown (collectively referred to herein as "components"), the technical solution environment of cloud computing system 100 corresponds to FIGS. 1A and 1B.

With reference to FIG. 2A, FIG. 2A illustrates cloud computing system 100 including a cloud computing system 100, network management engine 112, cross-premises networking information database 120, hybrid cloud network extension 130, on-premise network extension 140, and on-premise network with network management engine 152.

The network management engine 110 provides a network management engine client (e.g., network management engine client 112 and network management engine client 152). The network management engine client can be a network conflict management service or application that supports performing the functionality described herein. The network management engine client can be implemented as part of a portal (e.g., a web-based frontend) associated with a customer managing their subscription to the cloud computing system. The network management engine can support receiving a request to configure a network—along with networking information for the network—such that, the networking information is compared to networking information in the cross-premises networking information database to determine if a conflict exists. The network management engine can further support causing presentation of a notification on an interface associated with configuring new networks associated with the cloud-provider network. For example, the network management engine can present a notification that a network conflict exists, where the notification includes cross-premises networking information that identifies an overlapping IP range and corresponding on-premise extension data.

The network management engine 110 maintains the cross-premises networking information database 120. The cross-premises networking information database 120 include on-premise extension data associated with routing an on-premise network (e.g., on-premise network 150) to a cloud-provider network. The on-premise extension data can include different mechanisms that support extending an on-premise network into the cloud-provider network. The cross-premises networking information database support tracking different type of networks—include networks that are extended from on-premises computing environments to avoid network conflicts. The cross-premises networking information includes a plurality of networks associated with the cloud-provider network, where each of the plurality of networks comprises corresponding on-premise extension data and an Internet Protocol (IP) range.

The network management engine 110 maintains the cross-premises networking information based on querying network objects that stored network objects that store networking information that is associated with identifying the plurality of networks and their corresponding on-premise extension data. The cross-premises information can be maintained based on periodically updating the cross-premises networking information or dynamically updating cross-premises networking information. The cloud provider can maintain network objects and the customer may also provide network objects that are queried to aggregate cross-premises networking information. The cross-premises networking information is associated with a plurality of on-premise extension connectivity models. An on-premise extension connectivity model is a specific configuration for connectivity between on-premise networks and cloud-provider. As such, if a network conflict is identified an on-premise extension connectivity model associated with the network conflict can be identified in a notification indicating a network conflict exists. On-premise extension connectivity model can be a service provider model (e.g., cloud exchange co-location, point-to-point Ethernet connection, any-to-any (IPVPN) connection) and a direct model (e.g., ExpressRoute site). Moreover, the on-premise extension data can further identify a third-party connectivity provider associated with configuring the private dedicated connection between a corresponding on-premise network and the cloud-provider network. Advantageously, operations for addressing any potential or actual network conflicts are improved based on storing networking information of on-premise networks and their corresponding on-premise extension connectivity models and third-party connectivity providers.

Operationally, the networking information can be retrieved from the cross-premises networking information database (e.g., via a network management engine client) to compare the networking information of a first network with information from a second network. A determination can be made that a potential network conflict exists or an actual network conflict exists. A potential network conflict exist when the networking information of the second network is provided as a request to create the second network. An actual conflict can exist if the cross-premises networking information is aggregated for the cloud computing system and comparing an active first network to an active second network reveals an overlap in the IP ranges of the active first network and the active second network.

Moreover, determining that at least a potential network conflict exists between the first network and the second network is based on comparing an IP range of the first network to an IP range of the second network, and determining that one or more overlapping IP addresses exist between the IP range of the first network and the IP range of the second network. The first network and the second network can be associated with the same subscription identifier of a customer. For example, it is contemplated that a network conflict exists when a customer configures a first network in their subscription with a first IP range that overlaps with a second IP range of a second network in their subscription. As such, a notification that a network conflict exists can further include the subscription identifier and indication that both networks are associated with the same subscription identifier.

It is contemplated that a third network is compared to a second network and a determination is made that no network conflict exists. A notification can be communicated that no network conflict exists between a third network and the second network. In this way, the network management engine also support communication notifications that no network conflicts exists, for example, a new network request can be approved based on determining that no network conflict exists.

With reference to FIG. 2B, FIG. 2B illustrates network management engine 110 and network management engine client 152 that support providing a network conflict management service of a cloud computing system. At block 10, access cross-premises networking information from a plurality of networks associated with a cloud-provider network. At block 12, generate a cross-premises networking information database comprising the cross-premises networking information. At block 14, maintain the cross-premises networking information database to support execution of network conflict checks between the plurality of network in the cross-premises networking information database and a second network.

At block 16, access cross-premises networking information from a cross-premises networking information database. At block 18, retrieve networking information of a first network from the cross-premises networking information database. At block 20, compare the networking information of the first network to networking information of a second network. At block 22, determine that at least a potential conflict exists between the first network and the second network. At block 24, communicate a notification associated with the at least potential network conflict.

At block 26, receive a request to create a second network associated with networking information of the second network. At block 28, access networking information of a first network from a cross-premises networking information database. At block 30, determine that a network conflict exists between the first network and the second network based on comparing the networking information of the first network to the networking information of the second network. At block 32, cause presentation of a notification associated with the network conflict.

Exemplary Methods

Figure 3:
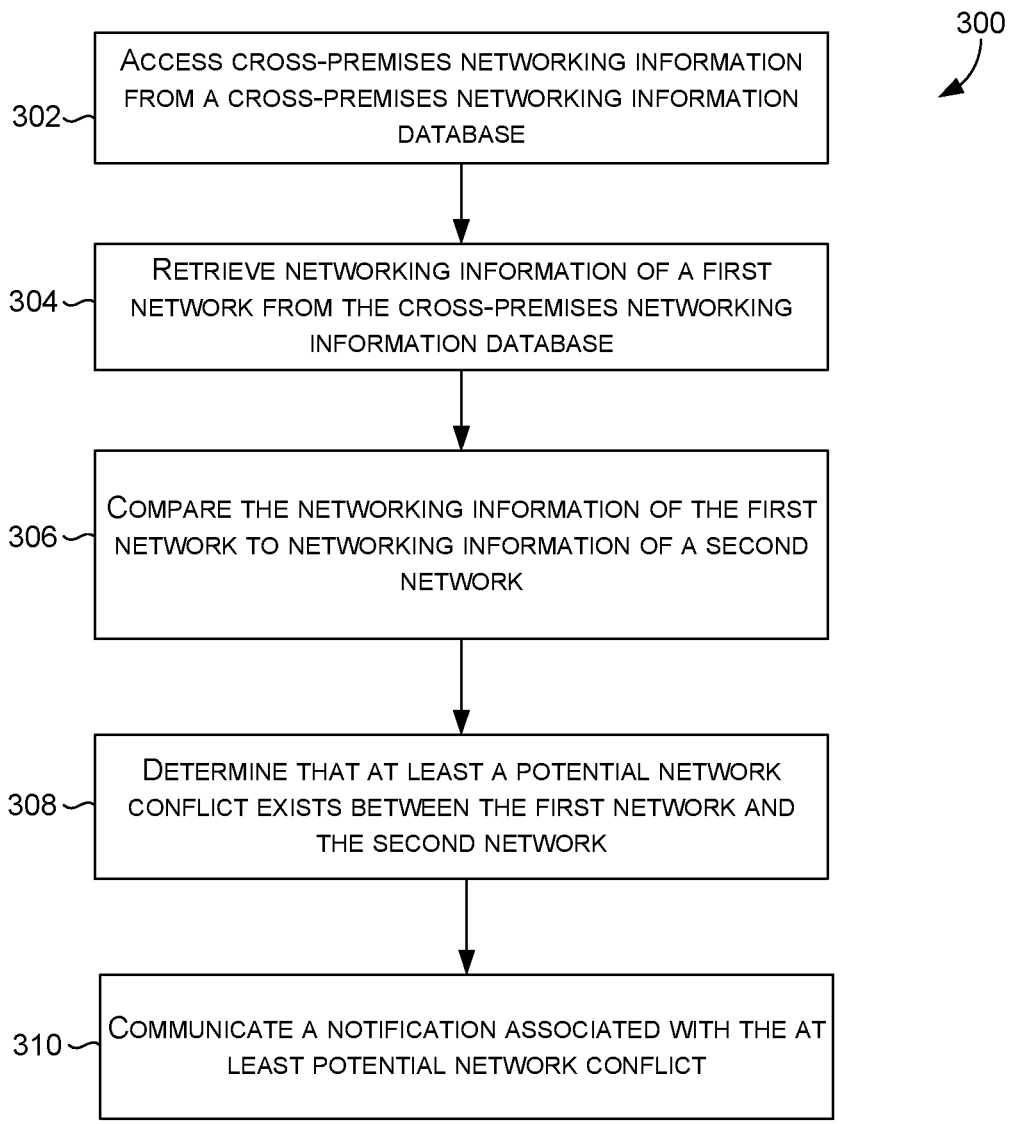
FIG. 3 is a flow diagram showing an exemplary method for implementing a cloud computing system with a network management engine, in accordance with embodiments described herein.
Figure 4:
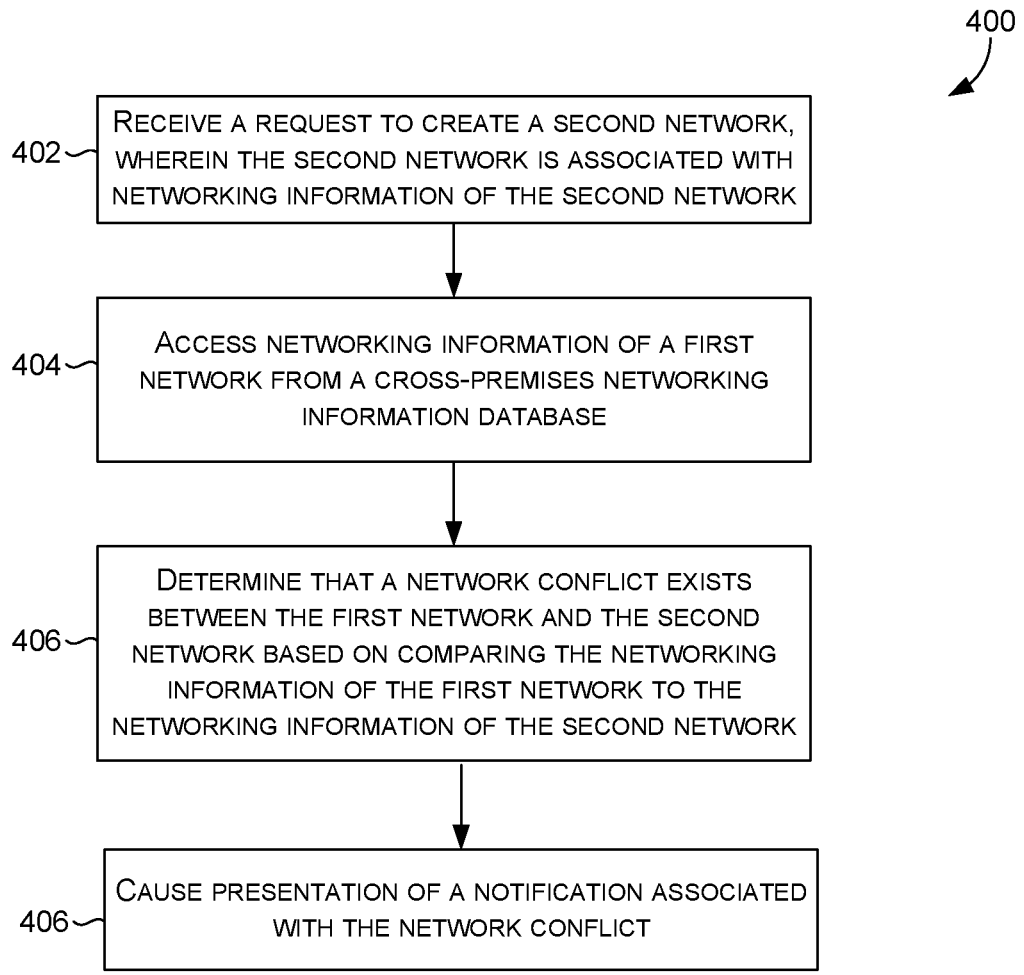
FIG. 4 is a flow diagram showing an exemplary method for implementing a cloud computing system with a network management engine, in accordance with embodiments described herein.
Figure 5:
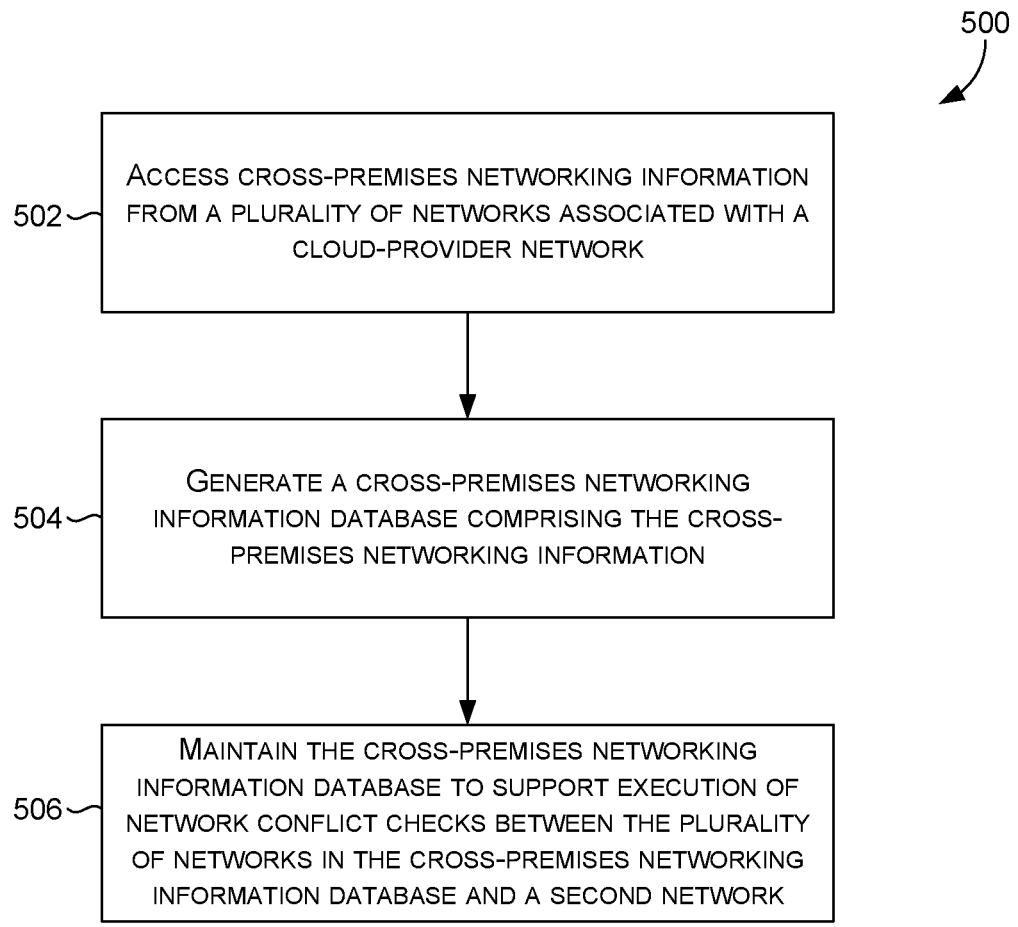
FIG. 5 is a flow diagram showing an exemplary method for implementing a cloud computing system with a network management engine, in accordance with embodiments described herein.

With reference to FIGS. 3, 4, and 5, flow diagrams are provided illustrating methods for providing a network conflict management service associated with a network management engine of a cloud computing system. The methods may be performed using the cloud computing system described herein. In embodiments, one or more computer-storage media having computer-executable or computer-useable instructions embodied thereon that, when executed, by one or more processors can cause the one or more processors to perform the methods (e.g., computer-implemented method) in the cloud computing system (e.g., a computerized system or computing system).

Turning to FIG. 3, a flow diagram is provided that illustrates a method 300 for providing a network conflict management service associated with a network management engine of a cloud computing system. At block 302, access cross-premises networking information from a cross-premises networking information database. At block 304, retrieve networking information of a first network from the cross-premises networking information database. At block 306, compare the networking information of the first network to networking information of a second network. At block 308, determine that at least a potential network conflict exists between the first network and second network. At block 310, communicate a notification associated with the at least potential network conflict.

Turning to FIG. 4, a flow diagram is provided that illustrates a method 400 for providing a network conflict management service associated with a network management engine of a cloud computing system. At block 402, receive a request to create a second network that is associated with networking information of the second network. At block 404, access networking information of a first network from a cross-premises networking information database. At block 406, determine that a network conflict exists between the first network and the second network based on comparing the networking information of the first network to the networking information of the second network. At block 406, cause presentation of a notification associated with the network conflict.

Turning to FIG. 5, a flow diagram is provided that illustrates a method 500 for providing a network conflict management service associated with a network management engine of a cloud computing system. At block 502, access cross-premises networking information from a plurality of networks associated with a cloud-provider network. At 504, generate a cross-premises networking information database comprising the cross-premises networking information. At 506, maintain the cross-premises networking information database to support execution of network conflict checks between the plurality of networks in the cross-premises networking information database and a second network Embodiments of the present invention have been described with reference to several inventive features (e.g., operations, systems, engines, and components) associated with a cloud computing system having a network management engine and network management engine for providing a network conflict management service associated with a network management engine of a cloud computing system. Inventive features described include: operations, interfaces, data structures, and arrangements of computing resources associated with providing the functionality described herein relative with reference to cross-premises networking database, networking management engine and user interfaces providing user interaction models. Functionality of the embodiments of the present invention have further been described, by way of an implementation and anecdotal examples to demonstrate that the operations for providing the network conflict management service are an unconventional ordered combination of operations that operate with a network management engine as a solution to a specific problem in meeting management technology environment to improve computing operations and interfaces for user interface navigation in cloud computing systems. Overall, these improvements result in less CPU computation, smaller memory requirements, and increased flexibility in cloud computing systems when compared to previous conventional cloud computing system operations performed for similar functionality.

Additional Support for Detailed Description of the Invention

Example Distributed Computing System Environment

Figure 6:
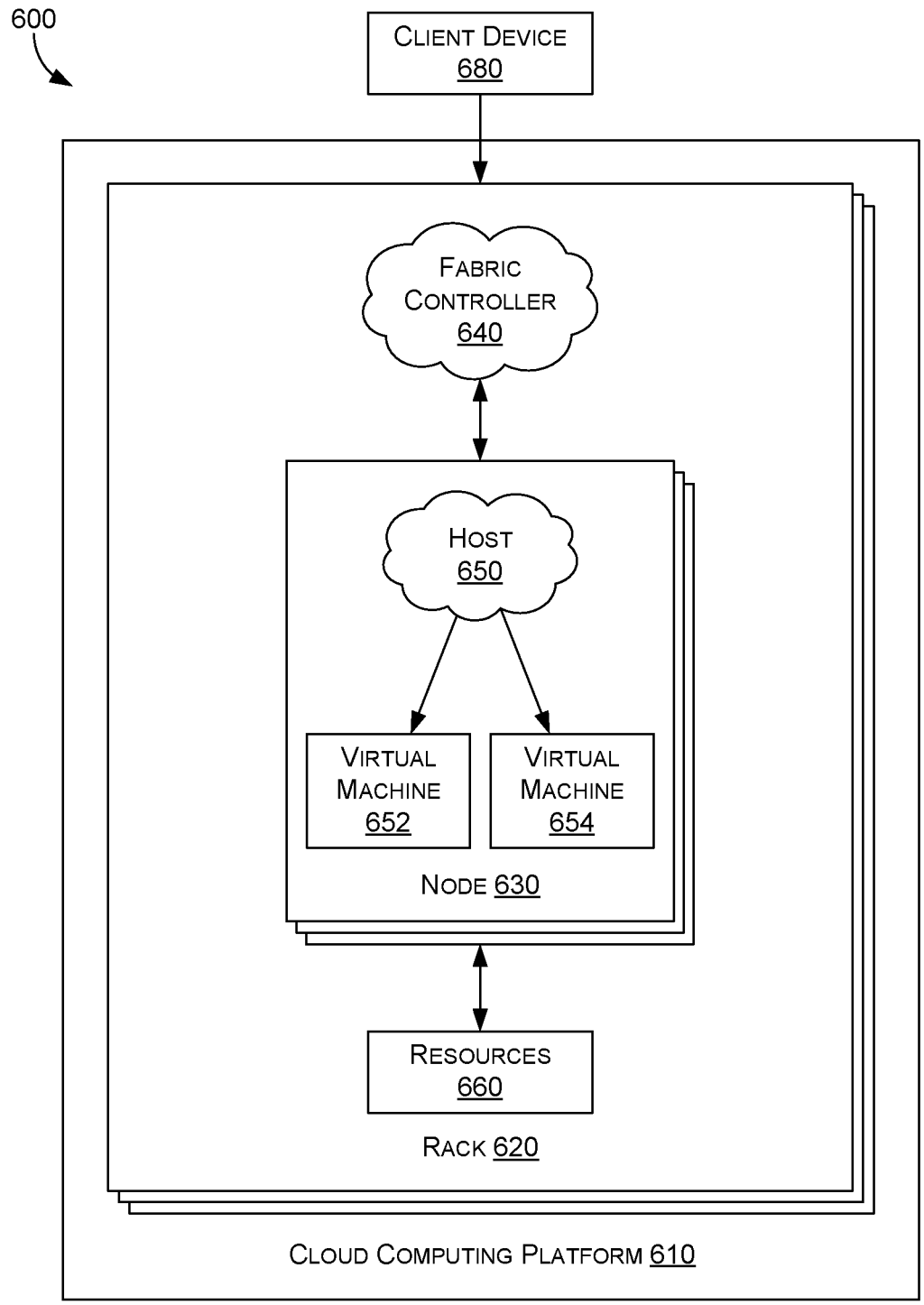
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
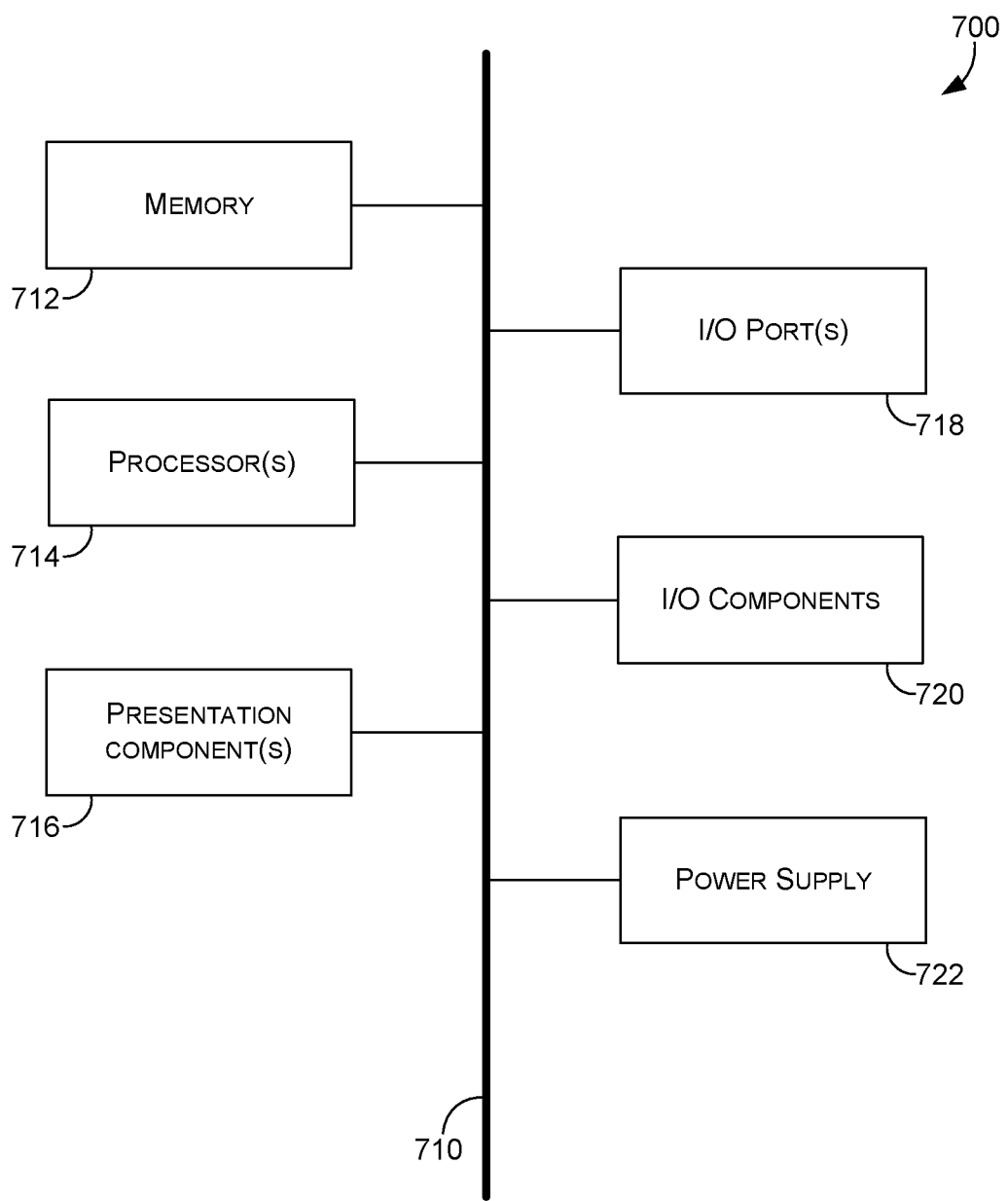
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

Embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system, the computerized system comprising:
   at least one computer processor; and
   computer memory storing computer-useable instructions that, when used by the at least one computer processor, cause the at least one computer processor to perform operations comprising:
   receiving a request to create a second network associated with a first network that is an active network, wherein the request is associated with networking information of the second network;
   accessing, at a network management engine client, cross-premises networking information from a cross-premises networking information database, wherein the cross-premises networking information comprises on-premise network extension data associated with routing an on-premise network to a cloud-provider network;
   retrieving networking information of the first network from the cross-premises networking information database;
   comparing the networking information of the first network to the networking information of the second network;
   determining that a potential network conflict exists between the first network and the second network based on the comparison between the networking information of the first network to the networking information of the second network; and
   causing presentation of a notification associated with the potential network conflict.

2. The computerized system of claim 1, wherein the cross-premises networking information comprises a plurality of networks associated with the cloud-provider network, wherein each of the plurality of networks comprises corresponding on-premise extension data and an Internet Protocol (IP) range, wherein the cross-premises networking information database is generated based on network objects that store networking information that is associated with identifying the plurality of networks and their corresponding on-premise network extension data.

3. The computerized system of claim 1, wherein the cross-premises networking information is associated with a plurality of on-premise extension connectivity models, wherein an on-premise extension connectivity model is a specific configuration for connectivity between on-premise networks and the cloud-provider network.

4. The computerized system of claim 1, wherein the cross-premises networking information identifies a third-party connectivity provider associated with configuring a private dedicated connection between a corresponding on-premise network and the cloud-provider network.

5. The computerized system of claim 1, wherein determining that at least a potential network conflict exists between the first network and the second network is based on comparing an Internet Protocol (IP) range of the first network to an IP range of the second network and determining that one or more overlapping IP addresses exist between the IP range of the first network and the IP range of the second network.

6. The computerized system of claim 1, wherein the first network and the second network are associated with a subscription identifier of a customer associated with the first network and the second network.

7. The computerized system of claim 1, wherein at least the potential network conflict is an actual network conflict, wherein an actual conflict exists when the first network and the second network are both active networks.

8. The computerized system of claim 1, the operations further comprising:
   comparing networking information of a third network to networking information of the second network; and
   based on comparing the networking information of the third network to networking information of second network, determining that no network conflict exists between the third network and the second network; and
   based on determining that no network conflict exists between the third network and the second network, communicating a notification associated with no network conflict existing.

9. The computerized system of claim 1, wherein the first network is a newly reconfigured network that was dynamically discovered after a configuration change.

10. The computerized system of claim 1, the operations further comprising maintaining the cross-premises networking information database based on periodically updating the cross-premises networking information or dynamically updating the cross-premises networking information.

11. The computerized system of claim 1, wherein the notification comprises cross-premises networking information that identifies the on-premises extension connectivity model associated with the at least potential network conflict.

12. The computerized system of claim 1, wherein the notification comprises cross-premises networking information that identifies an overlapping Internet Protocol (IP) range and corresponding on-premise extension data.

13. One or more computer-storage media having computer-executable instructions embodied thereon that, when executed by a computing system having a processor and memory, cause the processor to perform operations comprising:
   receiving a request to create a second network associated with a first network that is an active network, wherein the request is associated with networking information of the second network;
   accessing, at a network management engine client, cross-premises networking information from a cross-premises networking information database, wherein the cross-premises networking information comprises on-premise network extension data associated with routing an on-premise network to a cloud-provider network;

retrieving networking information of the first network from the cross-premises networking information database;

comparing the networking information of the first network to the networking information of the second network;

determining that a potential network conflict exists between the first network and the second network based on the comparison between the networking information of the first network to the networking information of the second network; and causing presentation of a notification associated with the potential network conflict.

14. The one computer-storage media of claim 13, wherein the cross-premises networking information comprises a plurality of networks associated with the cloud-provider network, wherein each of the plurality of networks comprises corresponding on-premise extension data and an Internet Protocol (IP) range.

15. The one computer-storage media of claim 13, wherein the cross-premises networking information is associated with a plurality of on-premise extension connectivity models, wherein an on-premise extension connectivity model is a specific configuration for connectivity between on-premise networks and the cloud-provider network.

16. The one computer-storage media of claim 13, the operations further comprising:

wherein the notification comprises cross-premises networking information that identifies an overlapping Internet Protocol (IP) range and corresponding on-premise extension data, the overlapping IP range is associated with the potential network conflict.

17. A computer-implemented method, comprising:

receiving a request to create a second network associated with a first network that is an active network, wherein the request is associated with networking information of the second network;

accessing, at a network management engine client, cross-premises networking information from a cross-premises networking information database, wherein the cross-premises networking information comprises on-premise network extension data associated with routing an on-premise network to a cloud-provider network;

retrieving networking information of the first network from the cross-premises networking information database;

comparing the networking information of the first network to the networking information of the second network;

determining that a potential network conflict exists between the first network and the second network based on the comparison between the networking information of the first network to the networking information of the second network; and causing presentation of a notification associated with the potential network conflict.

18. The computer-implemented method of claim 17, wherein the cross-premises networking information comprises a plurality of networks associated with the cloud-provider network, wherein each of the plurality of networks comprises corresponding on-premise extension data and an Internet Protocol (IP) range.

19. The computer-implemented method of claim 17, wherein the cross-premises networking information is associated with a plurality of on-premise extension connectivity models, wherein an on-premise extension connectivity model is a specific configuration for connectivity between on-premise networks and the cloud-provider network.

20. The computer-implemented method of claim 17, wherein the notification comprises cross-premises networking information that identifies an overlapping Internet Protocol (IP) range and corresponding on-premise extension data, the overlapping IP range is associated with the potential network conflict.

* * * * *